US012675389B2

(12) United States Patent
Zhang et al.

(10) Patent No.: US 12,675,389 B2
(45) Date of Patent: Jul. 7, 2026

(54) SOFTWARE TEST SYSTEM AND SOFTWARE TEST METHOD

(71) Applicants: Digiwin Software Co., Ltd, Shanghai (CN); DATA SYSTEMS CONSULTING CO., LTD., New Taipei City (TW)

(72) Inventors: Weiwei Zhang, Shanghai (CN); Lei Feng, Shanghai (CN); Guoxin Sun, Shanghai (CN)

(73) Assignees: DIGIWIN CO., LTD., Shanghai (CN); DATA SYSTEMS CO., LTD., New Taipei City (TW)

( * ) Notice: Subject to any disclaimer, the term of this patent is extended or adjusted under 35 U.S.C. 154(b) by 208 days.

(21) Appl. No.: 18/349,178

(22) Filed: Jul. 10, 2023

(65) Prior Publication Data

US 2024/0403201 A1 Dec. 5, 2024

(30) Foreign Application Priority Data

May 29, 2023 (CN) .......................... 202310612234.0

(51) Int. Cl.
*G06F 11/3668* (2025.01)
(52) U.S. Cl.
CPC ...... *G06F 11/3684* (2013.01); *G06F 11/3688* (2013.01); *G06F 11/3692* (2013.01)
(58) Field of Classification Search
CPC ..................................................... G06F 11/36
See application file for complete search history.

(56) References Cited

U.S. PATENT DOCUMENTS

| | | | | |
|---|---|---|---|---|
| 2011/0307860 A1 * | 12/2011 | Park | .......................... | G06F 8/30 |
| | | | | 717/145 |
| 2015/0339215 A1 * | 11/2015 | Liao | .................... | G06F 11/3684 |
| | | | | 717/125 |

(Continued)

FOREIGN PATENT DOCUMENTS

| | | | | |
|---|---|---|---|---|
| WO | WO-2021238596 A1 * | 12/2021 | ............... | G06F 9/54 |

OTHER PUBLICATIONS

English Translation with Original Chinese Application No. WO-2021238596-A1 (Year: 2021).*

(Continued)

*Primary Examiner* — Ziaul A Chowdhury
(74) *Attorney, Agent, or Firm* — JCIPRNET

(57) ABSTRACT

A software test method and a software test system including a storage device and a processor are provided. A plurality of modules are stored. The processor executes the modules in the storage device. An interface module accesses activated use case information of an electronic device to generate a test case file, so that the electronic device performs a test call operation on the interface module according to the test case file through a component under test (CUT). The interface module includes simulation component interfaces. Executing the test call operation includes sub-test call operations. An execution module respectively analyzes the sub-test call operations performed by the CUT sequentially calling the simulation component interfaces to generate sets of test progress information. A determination module generates and provides a test result to the electronic device according to a test configuration file and the sets of test progress information to improve test performance.

20 Claims, 5 Drawing Sheets

Accessing activated use case information to generate a test case file to enable an electronic device to perform a test call operation on an interface module according to the test case file through a CUT — S210

Respectively analyzing sub-test call operations performed by the CUT sequentially calling a plurality of simulation component interfaces to generate a plurality of sets of test progress information — S220

Generating a test result based on a test configuration file and the sets of test progress information — S230

(56) References Cited

U.S. PATENT DOCUMENTS

| 2016/0342501 | A1* | 11/2016 | Venkatesan ......... | G06F 11/3684 |
| 2017/0353524 | A1* | 12/2017 | Dacutanan ............ | H04M 15/73 |
| 2020/0026630 | A1* | 1/2020 | Schardt ............... | G06F 11/3419 |
| 2021/0390042 | A1* | 12/2021 | Fan ......................... | G10L 15/26 |
| 2023/0350794 | A1* | 11/2023 | Gong ................. | G06F 11/3684 |

OTHER PUBLICATIONS

English Translation of "Interface Calling Method And Apparatus, And Computer-Readable Storage Medium" with Page and Line Numbers (Year: 2021).*

\* cited by examiner

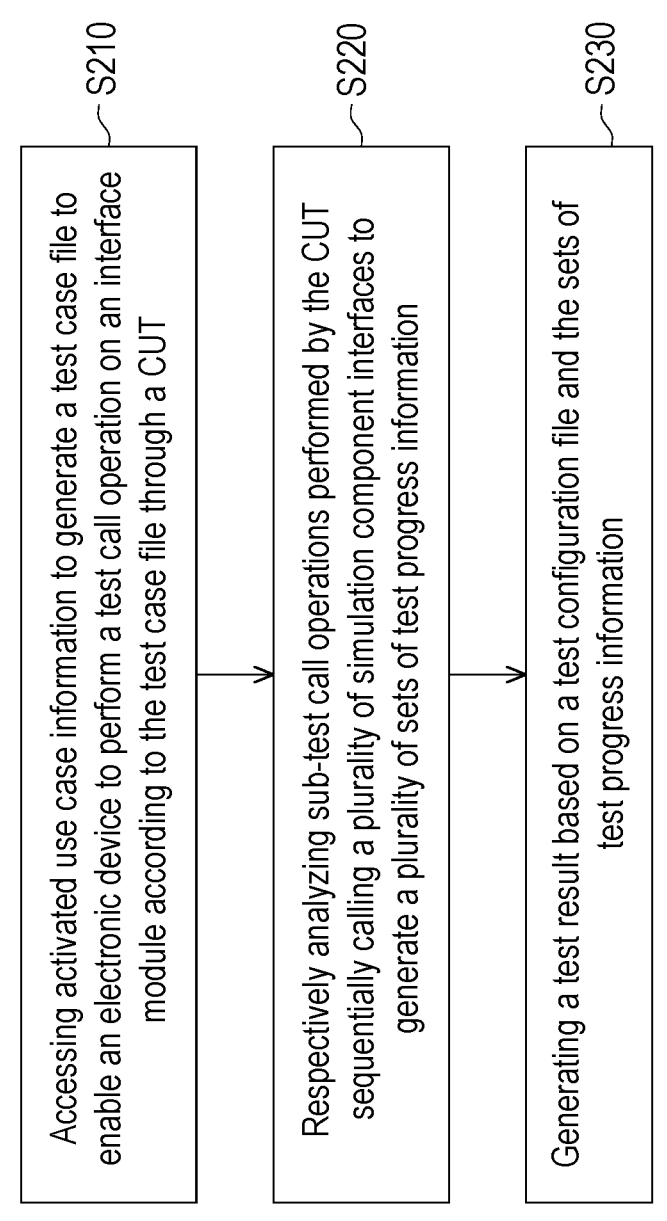

Accessing activated use case information to generate a test case file to enable an electronic device to perform a test call operation on an interface module according to the test case file through a CUT — S210

Respectively analyzing sub-test call operations performed by the CUT sequentially calling a plurality of simulation component interfaces to generate a plurality of sets of test progress information — S220

Generating a test result based on a test configuration file and the sets of test progress information — S230

FIG. 2

SOFTWARE TEST SYSTEM AND SOFTWARE TEST METHOD

CROSS-REFERENCE TO RELATED APPLICATION

This application claims the priority benefit of China application serial no. 202310612234.0, filed on May 29, 2023. The entirety of the above-mentioned patent application is hereby incorporated by reference herein and made a part of this specification.

BACKGROUND

Technical Field

The disclosure relates to a test system; more particularly, the disclosure relates to a software test system and a software test method applied to software.

Description of Related Art

Software may be segmented into one or more components, which are then combined with other service components to fulfill specific requirements based on different use cases. Typically, the components may undergo functional tests, where test cases are used to generate returned results. This allows people who perform the tests to determine whether the components function correctly by examining the returned results.

However, the utilization of application data-driven programming in the complex business logic of the components poses a challenge. The returned results may merely indicate whether the overall operations of the components function normally, without being able to access specific scenario requirements associated with each business logic. In simpler terms, when using data-driven programming in the components, conducting the functional tests cannot determine the correctness of an internal call sequence and corresponding input data for the components using application data-driven programming. This places an additional burden on those who conduct the tests.

SUMMARY

The disclosure provides a software test system capable of inspecting a plurality of call operations performed by a component under test (CUT) one by one, so as to improve the test performance.

According to an embodiment of the disclosure, a software test system including a storage device and a processor is provided. The storage device stores a plurality of modules. The processor is coupled to the storage device and executes the modules, where the modules include an interface module, an execution module, and a determination module. The interface module accesses activated use case information of an electronic device to generate a test case file, so that the electronic device performs a test call operation on the interface module according to the test case file through a CUT. The interface module includes a plurality of simulation component interfaces, and the test call operation includes a plurality of sub-test call operations. The execution module respectively analyzes the sub-test call operations performed by the CUT sequentially calling the simulation component interfaces to generate a plurality of sets of test progress information. The determination module generates a test result to the electronic device based on a test configuration file and the sets of test progress information.

According to an embodiment of the disclosure, a software test method includes following steps. A plurality of modules are executed through a processor, where the modules include an interface module, an execution module, and a determination module. Activated use case information of an electronic device is accessed through the interface module to generate a test case file, so that the electronic device performs a test call operation on the interface module according to the test case file through a CUT, where the interface module includes a plurality of simulation component interfaces, and the test call operation includes a plurality of sub-test call operations. The sub-test call operations performed by the CUT sequentially calling the simulation component interfaces are analyzed through the execution module to generate a plurality of sets of test progress information. A test result is generated and provided to the electronic device through the determination module according to a test configuration file and the sets of test progress information.

In view of the above, the software test system and the software test method provided in one or more embodiments of the disclosure generate a test case file through the interface module, so as to trigger the CUT to operate based on the test case file through the electronic device. In addition, by sequentially analyzing the sub-test call operations performed by the CUT through the execution module, the scenario requirements (i.e., the sets of test progress information) of the operations may be determined one by one, based on which whether the CUT operates normally may be determined. Accordingly, the test performance is improved.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2 is a flowchart illustrating a software test method according to an embodiment of the disclosure.

DESCRIPTION OF THE EMBODIMENTS

Figure 1:
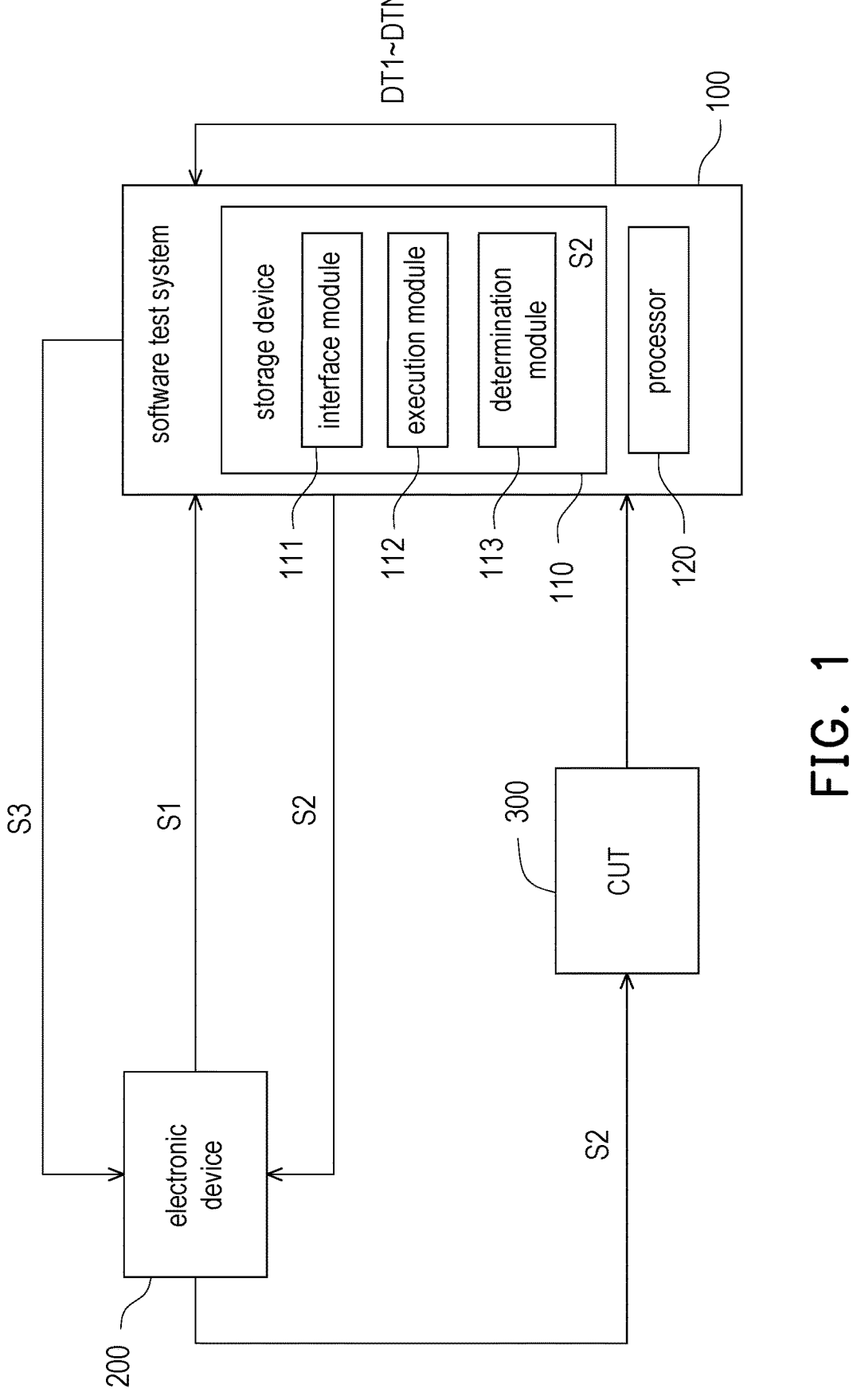
FIG. 1 is a circuit block view illustrating a software test system according to an embodiment of the disclosure.

Reference will now be made in detail to the embodiments of the disclosure, examples of which are illustrated in the accompanying drawings. Wherever possible, the same reference numbers are used in the drawings and the description to refer to the same or like parts.

FIG. 1 is a circuit block view illustrating a software test system according to an embodiment of the disclosure. With reference to FIG. 1, a software test system 100 may be an application functional test system for a user to perform tests on a target component. The target component may be, for instance, an independent part in the software that is modularized and replaceable and may obtain target requirements through an interface in a scenario to achieve corresponding functions. In this embodiment, the target component may be, for instance, a component using application data-driven programming, whereby target requirements are obtained through a series of action logics. The target component may be, for instance, implemented as a component under test (CUT) 300.

In this embodiment, the software test system 100 is coupled to an electronic device 200 and the CUT 300. The electronic device 200 may operate a user interface to call the software test system 100 and the CUT 300 through an application programming interface (API) and further obtain the target requirements through the software test system 100 and the CUT 300. For instance, the electronic device 200 calls the CUT 300 through the API, so as to enable the CUT 300 to further call the software test system 100, based on which the software test system 100 obtains results of functional tests of the CUT 300 (i.e., a test result S3).

In this embodiment, the electronic device 200 may also operate the user interface to call various components in an enterprise system through the API and further execute various business services through the components. The enterprise system may be, for instance, an enterprise resource planning (ERP) system. The electronic device 200 may be, for instance, a mobile phone, a tablet computer, a laptop, a desktop computer, and so forth. In this embodiment, the CUT 300 may be, for instance, a component applied in the enterprise system.

In this embodiment, the software test system 100 may be set in the cloud, allowing a user to make connections through the electronic device 200 and execute the related business service functions of different APIs (such as the related functions of the ERP system) also set in the software test system 100. The software test system 100 may be, for instance, a software as a service (SaaS) server, which executes application programs for performing the functional tests on the enterprise system (e.g., the CUT 300) through the APIs. In some embodiments, the software test system 100 may be set in the local environment of an enterprise, allowing a user to connect the software test system 100 with other systems set in the cloud through the electronic device 200 and input/output data, so as to execute corresponding application programs through the APIs.

In this embodiment, the software test system 100 may include a storage device 110 and a processor 120. The storage device 110 may store a plurality of modules 111-113. The modules may include an interface module 111, an execution module 112, and a determination module 113. In this embodiment, the interface module 111 may include a plurality of simulation component interfaces (e.g., a plurality of interfaces in a simulation interface component 512 shown in FIG. 5).

In this embodiment, the storage device 110 may further store various algorithms, computational software, and the like for each of the modules 111-113 to achieve the invention, such as algorithms, programs, and data related to data-driven, calling, presetting, assertion, and various calculations. The storage device 110 may be, for instance, a dynamic random access memory (DRAM), a flash memory, a non-volatile random access memory (NVRAM), or a combination thereof.

In this embodiment, the processor 120 is coupled to the storage device 110. The processor 120 may access the storage device 110 and may execute data in the storage device 110, each of the modules 111-113, data from the electronic device 200 (e.g., activated use case information S1), and data from the CUT 300. In this embodiment, the processor 120 may be, for instance, a signal converter, a field programmable gate array (FPGA), a central processing unit (CPU), or any other programmable general-purpose or special-purpose microprocessor, digital signal processor (DSP), programmable controller, application-specific integrated circuit (ASIC), programmable logic device (PLD), another similar device, or combinations of these devices, which may load and execute computer program-related firmware or software to achieve a data-driven function, a calling function, a presetting function, an assertion function, various calculations, and an execution function.

FIG. 2 is a flowchart illustrating a software test method according to an embodiment of the disclosure. With reference to FIG. 1 and FIG. 2, the software test system 100 may execute steps S210-S230. An order of the steps S210-S230 is exemplary and should not be construed as a limitation in the disclosure.

In step S210, the processor 120 executes the interface module 111, thus allowing the interface module 111 to access activated use case information S1 of the electronic device 200 to generate a test case file S2, and the electronic device 200 is enabled to perform a test call operation on the interface module 111 according to the test case file S2 through the CUT 300. In this embodiment, the test call operation may include a plurality of sub-test call operations corresponding to a plurality of logic configurations.

In other words, the electronic device 200 may initiate a functional test operation through the activated use case information S1. At this time, the interface module 111 defines a test case file S2 according to the activated use case information S1 and outputs the test case file S2 to the electronic device 200. The electronic device 200 calls the CUT 300 according to the test case file S2, so that the CUT 300 calls the interface module 111 according to the test case file S2 to start testing various action logics of the CUT 300.

In this embodiment, the activated use case information S1 may, for instance, indicate which component (such as the CUT 300) undergoes the functional test operation. In this embodiment, the test case file S2 may be, for instance, a plurality of logic configurations and assertion configurations defined according to various test scenarios and data configurations corresponding to the logics, such as request configurations, preset configurations, and response configurations. That is, the test case file S2 may include a plurality of sets of use case configurations. The use case configurations may regulate a plurality of call steps (i.e., a plurality of sub-test call operations) when the CUT 300 performs the test call operation. In this embodiment, the test case file S2 may, for instance, be implemented in form of programming languages, such as JavaScript Object Notation (JSON), extensible markup language (XML), or YAML, which should not be construed as a limitation in the disclosure.

In step S220, the processor 120 executes the execution module 112, so that the execution module 112 respectively analyzes the sub-test call operations performed by the CUT 300 sequentially calling a plurality of simulation component interfaces to generate a plurality of sets of test progress information DT1-DTN, where N may be, for instance, a positive integer.

In this embodiment, the simulation component interfaces in the interface module 111 may, for instance, correspond to the interfaces of the logic configurations in the test case file S2. That is, the simulation component interfaces may be simulated as external API service interfaces required by the CUT 300. Since the CUT 300 calls the simulation component interfaces in sequence based on the logic configurations, in each call step (i.e., the sub-test call operation), the execution module 112 accesses and analyzes each call step to generate a corresponding set of data configuration (e.g., the test progress information DT1).

In this embodiment, the test progress information DT1-DTN may be, for instance, the data used (or generated) by the CUT 300 during the execution of the sub-test call operations, and plurality of data configurations accessed and generated by the execution module 112. Each data configuration corresponds to one step (i.e., one sub-test call operation) in the test call operation and may include, for instance, the assertion configuration, the request configuration, the preset configuration, and the response configuration and may serve as the test content of each step.

In step S230, the processor 120 executes the determination module 113, so that the determination module 113 generates the test result S3 based on the test case file S2 and the sets of test progress information DT1-DTN. In addition, the determination module 113 outputs the test result S3 to the electronic device 200 for a user to observe whether the CUT 300 passes the functional test. That is, the determination module 113 determines whether the CUT 300 complies with the specifications of the test case file S2 based on the test progress information DT1-DTN. The specifications may include, for instance, data configurations, such as a call sequence, a call count, and corresponding call content of the sub-test call operations. Thereby, the determination module 113 generates the test result S3 to indicate whether the CUT 300 passes the functional test and may operate normally.

By generating the test case file S2 according to the activated use case information S1 through the interface module 111, note that the CUT 300 may be triggered by the electronic device 200 to start executing the test function operation. In addition, by using the simulation component interfaces of the interface module 111 as the simulated API service interfaces, the CUT 300 sequentially calls the simulation component interfaces to sequentially analyze the sub-test call operations through the execution module 121, so as to determine the scenario requirements (i.e., the sets of test progress information) of the operations one by one. As such, the software test system 100 may achieve tests performed on each external call operation (i.e., each sub-test call operation) occurring in the data-driven component (i.e., the CUT 300). By refining the internal action logic of the CUT 300, the scenario coverage of the test cases may be improved, and a design error rate of the CUT 300 may be reduced, thereby enhancing the accuracy and performance of the functional test operation.

Figure 3:
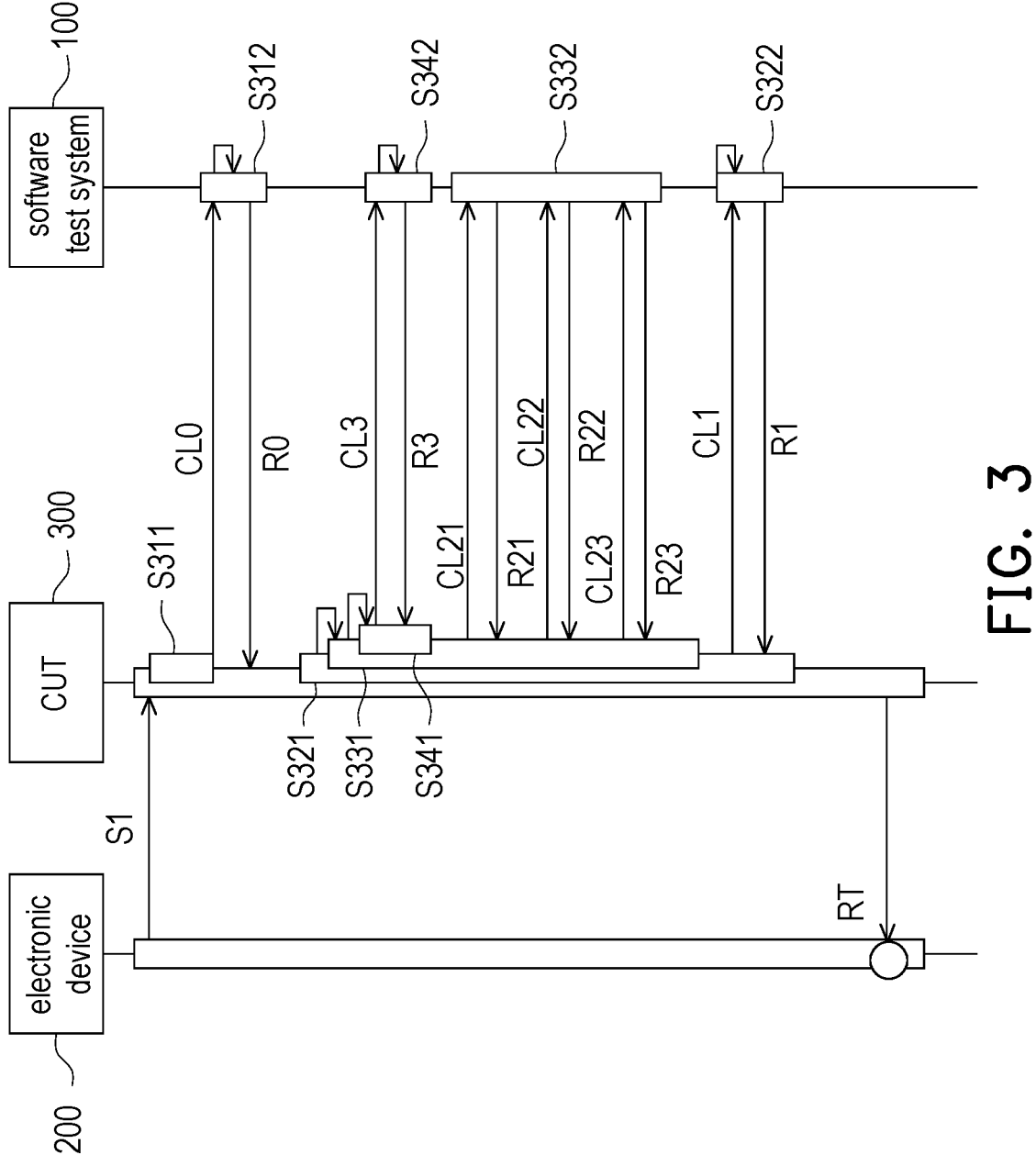
FIG. 3 is a schematic view illustrating an operation of the software test system provided in the embodiment of the disclosure depicted in FIG. 1.

FIG. 3 is a schematic view illustrating an operation of the software test system provided in the embodiment of the disclosure depicted in FIG. 1. With reference to FIG. 1 and FIG. 3, the electronic device 200, the CUT 300, and the software test system 100 may be operated in collaboration to perform functional test operations through executing modules S311-342, so as to exemplify implementation details depicted in FIG. 2.

In this embodiment, the electronic device 200 outputs the activated use case information S1 to the CUT 300 and the software test system 100 to initiate a functional test operation. The software test system 100 defines (or creates) the test case file S2 based on the activated use case information S1 and provides the simulation component interfaces according to the test case file S2.

For instance, the scenario specified by the test case file S2 a sequence includes a plurality of action logics. The action logics may be, for instance, calling a BPM interface once (i.e., a first action logic), calling an ESP interface three times (i.e., a second action logic), and calling the ESP interface once (i.e., a third action logic). The simulation component interfaces provided by the interface module 111 may include a Knowledge maps interface, the BPM interface, and the ESP interface.

In this embodiment, the CUT 300 executes the module S311 to analyze input parameters of the test call operation according to the activated use case information S1. The CUT 300 outputs a call request CL0 to the software test system 100 (e.g., the Knowledge maps interface) based on the analyzed input parameters to obtain the action logics of the test call operation (i.e., the first logic to the third action logic). The software test system 100 executes the module S312 to make the Knowledge maps interface respond to the call request CL0 and send the first action logic to the third action logic defined in the test case file S2 back to the CUT 300. In this embodiment, the operations of the modules S311-S312 may, for instance, refer to the implementation details of the step S210 shown in FIG. 2.

The CUT 300 executes the module S341 to perform the third action logic according to the test case file S2. In detail, the CUT 300 outputs a call request CL3 to the software test system 100 (e.g., the ESP interface) to execute a first sub-test call operation. The software test system 100 executes the module S342 to make the ESP interface respond to the call request CL3 and send a call response R3 back to the CUT 300 to complete the first sub-test call operation. At the same time, the software test system 100 analyzes the first sub-test call operation associated with the ESP interface through the execution module 112 to generate a first set of the test progress information DT1. The first set of the test progress information DT1 may include the call request CL3 and the call response R3.

Next, the CUT 300 executes the module S331 to perform a second action logic according to the test case file S2. Specifically, the CUT 300 outputs a call request CL21 to the software test system 100 (e.g., the ESP interface) to perform a second sub-test call operation. The software test system 100 executes the module S332 to make the ESP interface respond to the call request CL21 and send a call response R21 back to the CUT 300 to complete the second sub-test call operation. At the same time, the software test system 100 analyzes the second sub-test call operation associated with the ESP interface through the execution module 112 to generate a second set of the test progress information DT2. The second set of the test progress information DT2 may include the call request CL21 and the call response R21.

In addition, the CUT 300 sequentially outputs call requests CL22 and CL23, so that the software test system 100 sequentially sends call responses R22 and R23 back to the CUT 300 to separately complete a third sub-test call operation and a fourth sub-test call operation. The software test system 100 analyzes the sub-test call operations through the execution module 112 to generate a plurality of sets of corresponding test progress information DT3 and DT4. The test progress information DT3 and DT4 may include the call requests CL22 and CL23 and the call responses R22 and R23.

The CUT 300 then executes the module S321 to perform the first action logic according to the test case file S2 and enables the software test system 100 to execute the module S322. The operations of the modules S321 and S322 may be deduced from the operations of the modules S331 and S332 by referring to the relevant descriptions. In this embodiment, the operations of the modules S321-S342 may, for instance, refer to the implementation details of the step S220 depicted in FIG. 2.

After the CUT 300 completes the test call operation, the software test system 100 generates the test result S3 according to the test case file S2 and the sets of test progress information DT1-DT4 and determines whether the CUT 300 passes the functional test. The software test system 100 applies the test result S3 as a call response RT and sends the call response RT back to the electronic device 200. In some embodiments, the software test system 100 sends back the call response RT through the CUT 300.

In this embodiment, passing the functional test or not may include some examples as follows. For instance, if each set of the test progress information DT1-DT4 conforms to the scenario specified by the test case file S2, the call response RT (i.e., the test result S3) indicates that the CUT 300 passes. By contrast, if the call response R23 in one set of the test progress information DT3 does not conform to the specification, the call response RT indicates that the CUT 300 fails to pass, and the content of the call response R23 does not conform to the expected scenario.

For instance, if the call request CL1 in one set of the test progress information DT1 is an ESP call request rather than a BPM call request, then the call response RT indicates that the CUT 300 fails to pass, and the executed call count of the ESP interface (i.e., the second action logic) does not conform to the expected scenario. Furthermore, if the call response R22 in one set of the test progress information DT2 is the content of the expected call response R21, then the call response RT indicates that the CUT 300 fails to pass, and the executed call sequence of the ESP interface (i.e., the second action logic) does not conform to the expected scenario.

Figure 4:
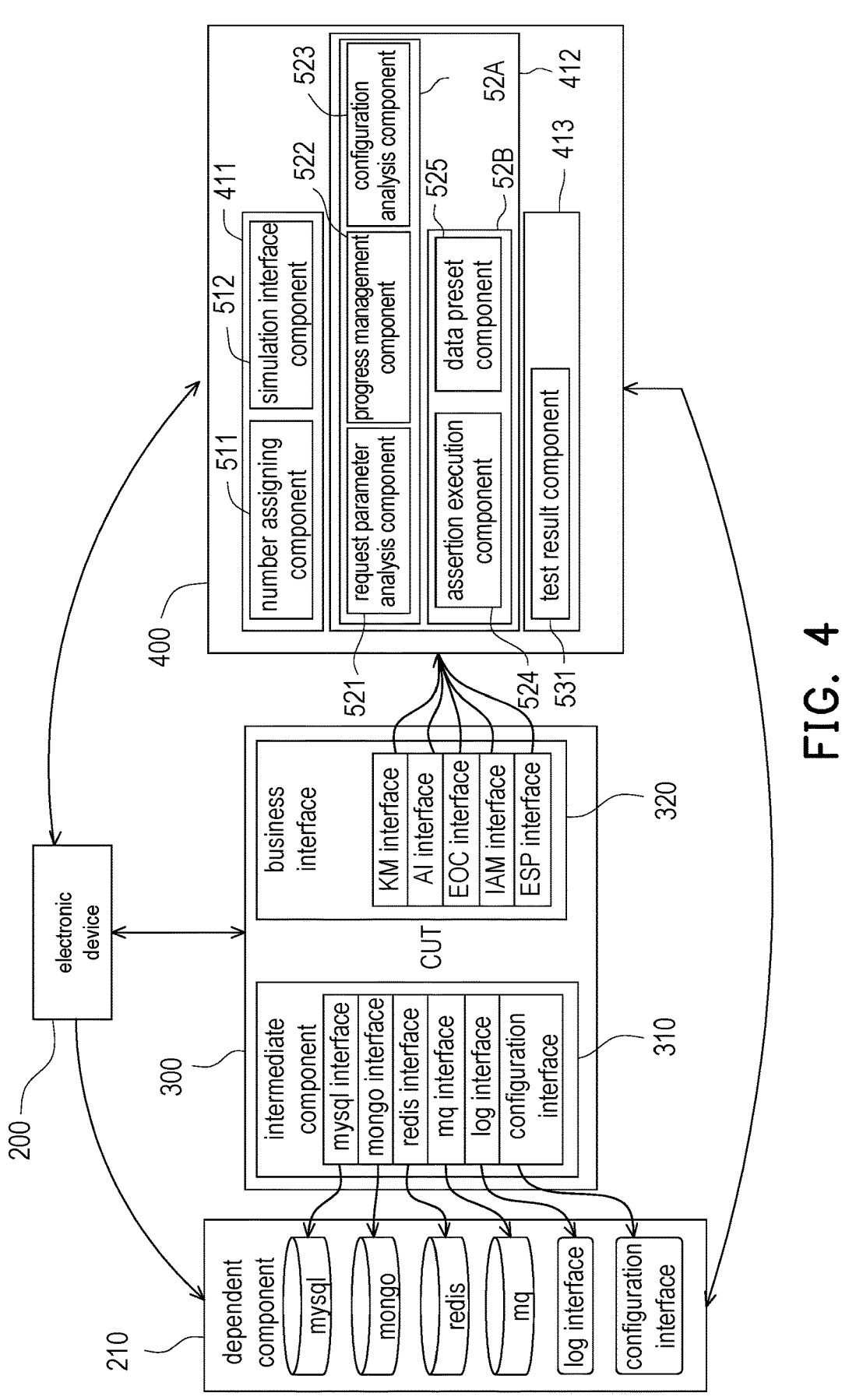
FIG. 4 is a circuit block view illustrating a software test system according to another embodiment of the disclosure.

FIG. 4 is a circuit block view illustrating a software test system according to another embodiment of the disclosure. With reference to FIG. 4, a software test system 400 is coupled to the electronic device 200, the CUT 300, and a dependent component 210. A storage device of the software test system 400 may store an interface module 411, an execution module 412, and a determination module 413. Descriptions of the software test system 400, a plurality of modules 411-413, the electronic device 200, and the CUT 300 may be deduced from the software test system 100 by referring to the relevant description.

In the embodiment shown in FIG. 4, the interface module 411 may include a number assigning component 511 and a simulation interface component 512. The interface module 411 generates a test case file (such as the test case file S2 shown in FIG. 1) through the number assigning component 511 and the simulation interface component 512 to prepare the test call operation. In this embodiment, the determination module 413 may include a test result component 531 to respond to a result of the test call operation (such as the test result S3 shown in FIG. 1).

In this embodiment, the execution module 412 may include a first execution component 52A and a second execution component 52B. Through the first execution component 52A and the second execution component 52B, the execution module 412 and the CUT 300 may be operated in collaboration to perform the test call operation. In this embodiment, the first execution component 52A may include a request parameter analysis component 521, a progress management component 522, and a configuration analysis component 523 for processing the call requests. The second execution component 52B may include an assertion execution component 524 and a data preset component 525.

In this embodiment, the electronic device 200 may operate a user interface to call the dependent component 210 through the API. The dependent component 210 may be, for instance, an external component applied in an enterprise system or other service systems. The dependent component 210 may be, for instance, a database set in a server to store address information of specific data. The dependent component 210 may include storage components, such as a MySQL database, a mongo database, a remote dictionary server (redis) database, an MQ database, a log center, a configuration center, and so on.

In this embodiment, the CUT 300 may include an intermediate component 310 and a business component 320. The intermediate component 310 may be, for instance, an interface component configured to call a storage device (e.g., the dependent component 210) to obtain the address information. The intermediate component 310 may include interface components, such as a MySQL interface, a mongo interface, a redis interface, an MQ interface, a log interface, a configuration interface, and so on. The interface components may respectively call a plurality of storage components in the dependent component 210. In this embodiment, the business component 320 may be, for instance, an interface component configured to call a service system (e.g., the software test system 400) to obtain the target requirements. The business component 320 includes interface components, such as a KM interface, an AI interface, an EOC interface, an IAM interface, an ESP interface, and so on. The interface components may respectively call the simulation component interfaces (e.g., a plurality of interfaces in the simulation interface component 512 shown in FIG. 5) in the software test system 400.

In this embodiment, the software test system 400 and the electronic device 200 may be set in the same environment (e.g., in the enterprise's local environment). The CUT 300 may be set in another environment (e.g., outside the enterprise's local environment). The dependent component 210 may be set in still another environment (e.g., in the cloud of an external system).

Figure 5:
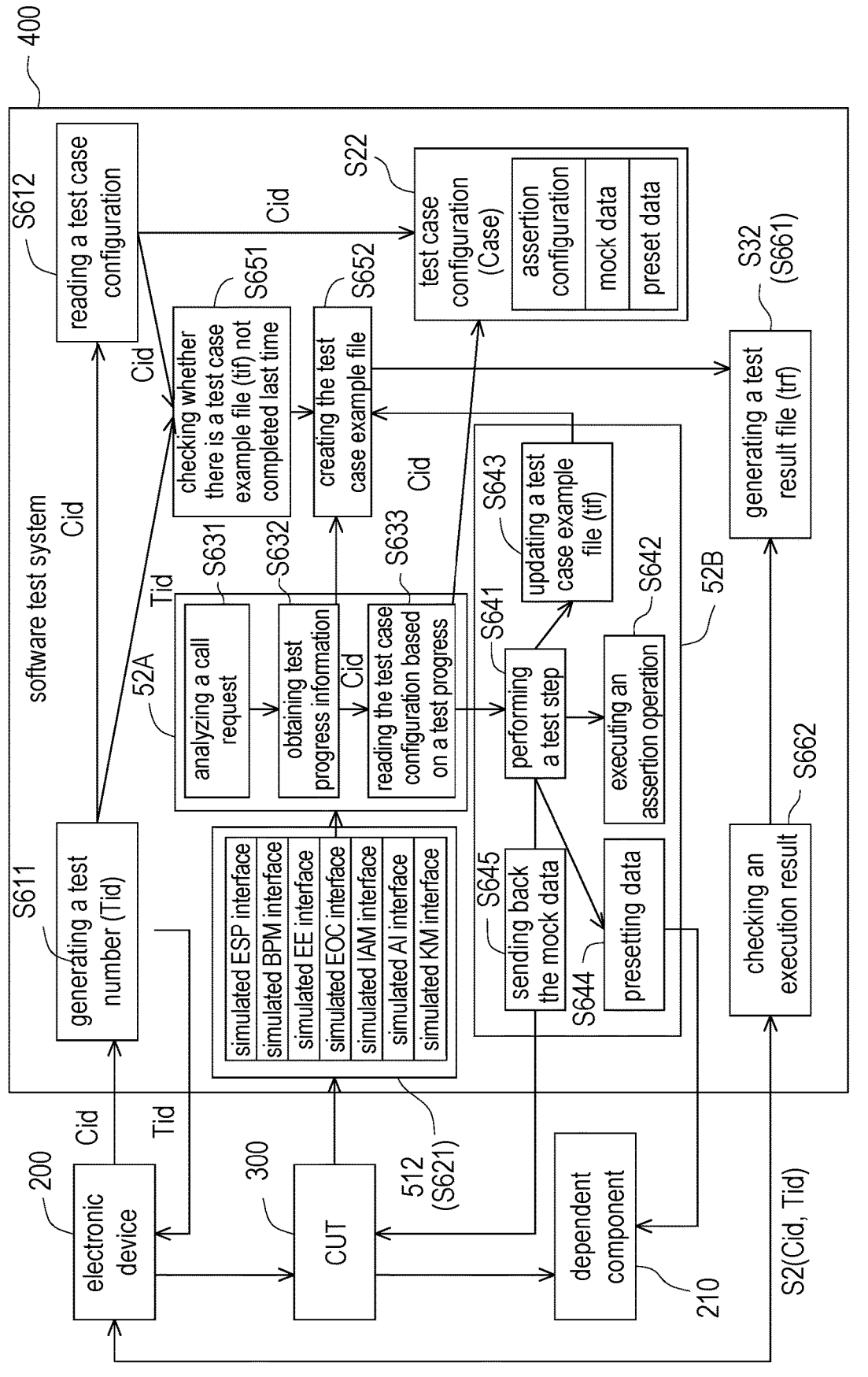
FIG. 5 is a schematic view illustrating an operation of the software test system provided in the embodiment of the disclosure depicted in FIG. 4.

Please refer to FIG. 5, which is a schematic view illustrating an operation of the software test system provided in the embodiment of the disclosure depicted in FIG. 4. The electronic device 200, the dependent component 210, the CUT 300, and the software test system 400 may cooperate to perform functional test operations by executing modules S611-S662, so as to exemplify the implementation details depicted in FIG. 2.

In this embodiment, activated use case information (such as the activated use case information S1 shown in FIG. 1) may include a test case configuration number Cid to indicate the current functional test operation. The electronic device 200 initiates the functional test operation based on the test case configuration number Cid. The test case configuration number Cid may be, for instance, a serial number of the functional test operation and serve as a unique identifier for the functional test operation.

In the functional test operation, the software test system 400 executes the modules S611-S612 to define (or create) the test case file S2 according to the test case configuration number Cid and sends the test case file S2 back to the electronic device 200. That is, before executing the test call operation, the electronic device 200 obtains a test number Tid of the functional test operation and obtains a corresponding test result file S32 (i.e., the test result S3 shown in FIG. 1) based on the test number Tid.

In this embodiment, the test case file S2 may include the test number Tid corresponding to the activated use case information (e.g., the test case configuration number Cid) and the test case configuration S22. The test number Tid may be, for instance, a serial number of a target component (e.g., the CUT 300) and serve as a unique identifier for the target component. The test case configuration S22 may be, for instance, scenario content specified by the test case file S2 and may include the test case configuration number Cid. The test case configuration S22 may include an assertion configuration, a response configuration (e.g., mock data), a preset data configuration, and so forth.

Particularly, in the module S611, the interface module 411 generates the test number Tid according to the test case configuration number Cid through the number assigning component 511. The interface module 411 sends the test number Tid back to the electronic device 200, so that the electronic device 200 performs a test call operation on the interface module 411 (e.g., the simulation interface component 512) through the CUT 300 according to the test number Tid. In the module S612, the interface module 411 reads the test case configuration S22 according to the test case configuration number Cid through the simulation interface component 512, so that the interface module 411 presets a plurality of simulation component interfaces that serve as simulated external interfaces according to the test case configuration S22 in the test case file S2 through the simulation interface component 512.

In this embodiment, the electronic device 200 calls the CUT 300 according to the test number Tid, so that the CUT 300 is enabled to execute the module S621 to start the test call operation. In detail, in the module S621, the CUT 300 sequentially performs a plurality of sub-test call operations on the preset simulation interface component 512. The simulation component interfaces in the simulation interface component 512 may include a simulated ESP interface, a simulated BPM interface, a simulated EE interface, a simulated EOC interface, a simulated IAM interface, a simulated AI interface, a simulated KM interface, and so on.

In this embodiment, each sub-test call operation may include presetting data and executing the test case configurations S22 in the test case file S2, so as to operate the assertion data, the response data (i.e., the mock data), and the preset data. Thereby, each sub-test call operation may enable the determination module 413 to determine in each subsequent module whether the corresponding set of the test progress information (such as the test progress information DT1-DTN shown in FIG. 1) passes the defined specifications to generate a corresponding test result file S32 in the test result.

After that, the execution module 412 executes the modules S631-S633 and S651-S652 to process and record the call request for each sub-test call operation through the first execution component 52A. In detail, in the module S631, the execution module 412 analyzes the content of the call request in each sub-test call operation through the request parameter analysis component 521 and initializes and packages the contents as an object corresponding to the call request (i.e., a request testing object).

In the module S632, the execution module 412 obtains the corresponding test progress information (e.g., the test progress information DT1 shown in FIG. 1) through the progress management component 522 according to the analyzed and packaged object. In the module S633, the execution module 412 reads the test case configuration S22 based on the current test progress and the test case configuration number Cid through the progress management component 522. Besides, the progress management component 522 may also read and modify each test progress and record the processes and data content in a test case example file.

In the module S651, the execution module 412 checks through the configuration analysis component 523 whether the current test case configuration S22 has an incomplete test case example file in the previous sub-test call operation according to the test number Tid and the test case configuration number Cid. If the check result is affirmative, the configuration analysis component 523 moves the incomplete test case example file to an error directory. By contrast, if the check result is negative, the configuration analysis component 523 proceeds to the module S652.

In the module S652, the execution module 412 configures a plurality of sets of test progress information as test case example files through the configuration analysis component 523, so as to create the test case example file by recording the test progress information (such as the test progress information DT1 shown in FIG. 1) in the test case example file. In this embodiment, the configuration analysis component 523 may create the test case example file based on the respective names of the test number Tid and the test case configuration number Cid.

In this embodiment, the test case example file may be, for instance, in a tif file format and may include a plurality of sets of test progress information. The test case example file may be stored in the test case configuration S22. That is, the test case example file may be, for instance, an example file in the execution process of the test call operation for recording specific execution information of the call request in each sub-test call operation.

Besides, in the module S652, the execution module 412 accesses step configuration information corresponding to the test progress information (such as the test progress information DT1 shown in FIG. 1) in the test case configuration S22 through the configuration analysis component 523. In this embodiment, the step configuration information may be, for instance, the specification of the current sub-test call operation and may include corresponding data configurations, such as assertion data, response data (i.e., mock data), and preset data in the test case configuration S22. In each sub-test call operation, the step configuration information may correspond to the test progress information.

In this embodiment, when the CUT 300 executes the last step of the current sub-test call operation, the execution module 412 performs the module S641. That is, the execution module 412 executes the operations as previously described for the modules S631-S633 through the components 521-523. The execution module 412 completes the parameter analysis of the current sub-test call operation and reads the current test progress information and the test case configuration S22 according to the test case configuration number Cid.

Next, the execution module 412 executes the modules S642-S645 to process and record the call response of each sub-test call operation through the second execution component 52B and accordingly generates a plurality of sets of test progress information (such as the test progress information DT1-DTN shown in FIG. 1). In this embodiment, the second execution component 52B performs the assertion operation, records specific execution information, and updates the test progress information to preset the configurations required for the next sub-test call operation, so as to complete the current sub-test call operation.

To be specific, in the module S642, the execution module 412 performs the assertion operation on the step configuration information according to the defined test case configuration S22 through the assertion execution component 524 to update the step configuration information. In the module S643, the execution module 412 updates the test case example file according to the updated step configuration information through the assertion execution component 524.

In this embodiment, the test result file S32 may be, for instance, in a trf file format and may include test result information corresponding to a plurality of sets of test progress information. That is, the test result file S32 may be a file that records the test results of the sub-test call operations. The test result file S32 may be converted from the test case example file.

In the module S644, the execution module 412 presets the test data corresponding to the next sub-test call operation according to the updated step configuration information through the data preset component 525. In other words, when the CUT 300 executes the last step of the current sub-test call operation, the data preset component 525 presets the data configuration required for the next sub-test call operation. For instance, the data preset component 525 obtains the address information of the preset data by calling at least one database in the dependent component 210 and continues to execute the sub-test call operations through calling the simulation component interfaces in the simulation interface component 512.

In the module S645, the execution module 412 sends the call response (i.e., mock data) corresponding to the current sub-test call operation back to the CUT 300 through the data preset component 525, thereby completing the current sub-test call operation.

Please return to the module S643; when the CUT 300 executes the last sub-test call operation, the execution module 412 applies the assertion execution component 524 to enable the test result component 531 to convert the latest test case example file into the test result file S32. That is, the software test system 400 executes the module S661 to generate the test result file S32 based on the test case configuration S22 and the sets of test progress information recorded in the test case example file. In this embodiment, the test result component 531 may create the test result file S32 according to the respective names of the test number Tid and the test case configuration number Cid.

Particularly, in the module S661, when any set of the test progress information in the test case example file does not conform to the specifications of the test case configuration S22 and thus indicates a no-pass, the determination module 413 converts the test case example file through the test result component 531 to generate the test result file S32. At the same time, the test result component 531 ends the test call operation. In other words, if the current sub-test operation is not passed, the test result component 531 records the corresponding data configuration and stops the test call operation.

In this embodiment, the test result file S32 may include the test progress information corresponding to each sub-test call operation, the corresponding step configuration information, and result information indicating whether the test progress information conforms or fails to conform to the corresponding step configuration information. The test result file S32 may indicate which sub-test call operation is passed or not and the corresponding scenario.

In this embodiment, the test result component 531 stores the test result file S32 to provide a user to inquire about a result of the function test operation through the electronic device 200. For instance, in the module S662, the electronic device 200 calls the determination module 413 (e.g., the test result component 531) according to the test number Tid to obtain the test result file S3, based on which the execution result is checked.

To sum up, in the software test system and the software test method provided in one or more embodiments of the disclosure, the simulation component interfaces serve as the simulated API service interfaces, so as to inspect the request content of internal calls in the CUT and send back the simulated responses. At the same time, the simulation component interfaces may verify the sequence, the uniqueness, and the correctness of calling various components by the CUT. As such, the software test system may inspect the behavior of the CUT by constructing the simulated scenarios, thereby examining the fault tolerance of each program, enabling people conducting the tests to quickly build test cases required for performing the functional test operations, and facilitating the maintenance and deployment of the test cases to improve the accuracy and the performance of the functional test operations.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A software test method, comprising:
executing a plurality of modules through a processor, wherein the modules comprise an interface module, an execution module, and a determination module;
accessing activated use case information of an electronic device through the interface module to generate a test case file, so that the electronic device performs a test call operation on the interface module according to the test case file through a component under test, wherein the interface module comprises a simulation interface comprising a plurality of simulation component interfaces, and the test call operation comprises a plurality of sub-test call operations corresponding to a plurality of logic configurations;
analyzing the sub-test call operations performed by the component under test sequentially calling the simulation component interfaces within the simulation interface through the execution module based on the plurality of logic configurations to generate a plurality of sets of test progress information; and
generating and providing a test result to the electronic device through the determination module according to a test configuration file and the sets of test progress information.

2. The software test method according to claim 1, wherein the test case file comprises a test number corresponding to the activated use case information and a test case configuration, wherein the electronic device performs the test call operation on the interface module through the component under test according to the test number.

3. The software test method according to claim 2, further comprising:
calling the determination module through the electronic device according to the test number to obtain the test result.

4. The software test method according to claim 1, further comprising:
presetting the simulation component interfaces through the interface module according to the test case file.

5. The software test method according to claim 1, wherein the step of analyzing the sub-test call operations performed by the component under test sequentially calling the simulation component interfaces to generate the sets of test progress information comprises:

analyzing each of the sub-test call operations through the execution module to obtain corresponding test progress information of the sets of test progress information; and accessing step configuration information corresponding to the test progress information in the test case file through the execution module.

6. The software test method according to claim 5, wherein the step of analyzing the sub-test call operations performed by the component under test sequentially calling the simulation component interfaces to generate the sets of test progress information comprises:

performing an assertion operation on the step configuration information through the execution module to update the step configuration information; and presetting test data corresponding to a next sub-test call operation of the sub-test call operations through the execution module according to the updated step configuration information.

7. The software test method according to claim 1, wherein the step of generating the test result to the electronic device according to the test configuration file and the sets of test progress information comprises:

determining whether each of the corresponding sets of test progress information indicates a pass to generate the test result through the determination module, wherein each of the sub-test call operations comprises presetting data and executing the test case file.

8. The software test method according to claim 1, further comprising:

configuring the sets of test progress information to be a test case example file through the execution module.

9. The software test method according to claim 8, wherein the step of generating the test result to the electronic device according to the test configuration file and the sets of test progress information comprises:

when any of the sets of test progress information indicates a no-pass, converting the test case example file through the determination module to generate the test result and ending the test call operation.

10. The software test method according to claim 1, further comprising:

calling at least one database and the simulation component interfaces through the execution module to execute the sub-test call operations.

11. A software test system, comprising:

a storage device, storing a plurality of modules; and a processor, coupled to the storage device and executing the modules, wherein the modules comprise an interface module, an execution module, and a determination module, wherein the interface module accesses activated use case information of an electronic device to generate a test case file, so that the electronic device performs a test call operation on the interface module according to the test case file through a component under test, wherein the interface module comprises a simulation interface comprising a plurality of simulation component interfaces, and the test call operation comprises a plurality of sub-test call operations corresponding to a plurality of logic configurations, wherein the execution module respectively analyzes the sub-test call operations performed by the component under test sequentially calling the simulation component interfaces within the simulation interface based on the plurality of logic configurations to generate a plurality of sets of test progress information, wherein the determination module generates and provides a test result to the electronic device based on a test configuration file and the sets of test progress information.

12. The software test system according to claim 11, wherein the test case file comprises a test number corresponding to the activated use case information and a test case configuration, wherein the electronic device performs the test call operation on the interface module through the component under test according to the test number.

13. The software test system according to claim 12, wherein the electronic device calls the determination module according to the test number to obtain the test result.

14. The software test system according to claim 11, wherein the interface module presets the simulation component interfaces according to the test case file.

15. The software test system according to claim 11, wherein the execution module analyzes each of the sub-test call operations to obtain corresponding test progress information of the sets of test progress information and accesses step configuration information corresponding to the test progress information in the test case file.

16. The software test system according to claim 15, wherein the execution module performs an assertion operation on the step configuration information to update the step configuration information and presets test data corresponding to a next sub-test call operation of the sub-test call operations according to the updated step configuration information.

17. The software test system according to claim 11, wherein each of the sub-test call operations comprises presetting data and executing the test case file, so that the determination module determines whether each of the corresponding sets of test progress information indicates a pass to generate the test result.

18. The software test system according to claim 11, wherein the execution module configures the sets of test progress information to be a test case example file.

19. The software test system according to claim 18, wherein when any of the sets of test progress information indicates a no-pass, the determination module converts the test case example file to generate the test result and ends the test call operation.

20. The software test system according to claim 11, wherein the execution module calls at least one database and the simulation component interfaces to execute the multiple sub-test call operations.

* * * * *